United States Patent

Holderer et al.

[11] Patent Number: 6,108,144
[45] Date of Patent: Aug. 22, 2000

[54] METHOD OF WELDING AN OPTICAL COMPONENT TO A METAL ATTACHMENT ELEMENT AND AN OPTICAL ASSEMBLY INCORPORATING THE METAL ATTACHMENT ELEMENT

[75] Inventors: Hubert Holderer, Königsbronn; Dietmar Eifler, An den Tongruben 65, 76764 Rheinzabern; Guntram Wagner, Otterberg; Peter Rümmer, Oberkochen; Johannes Deyhle, Königsbronn; Daniel Solbach, Düsseldorf, all of Germany

[73] Assignees: Dietmar Eifler, Kaiserslauten; Carl-Zeiss-Stiftung, Heidenheim-Brenz, both of Germany

[21] Appl. No.: 09/362,228

[22] Filed: Jul. 28, 1999

[30] Foreign Application Priority Data

Jul. 28, 1998 [DE] Germany ............... 198 33 590

[51] Int. Cl.[7] ............................................. G02B 7/02
[52] U.S. Cl. ............................................. 359/819
[58] Field of Search ............................ 359/819, 820, 359/811

[56] References Cited

U.S. PATENT DOCUMENTS 3,657,802  4/1972  Delmas .................................. 29/472.9

FOREIGN PATENT DOCUMENTS 0106230  7/1986  European Pat. Off. .
1629263  1/1971  Germany .
2312724  11/1973  Germany .
4216337  11/1993  Germany .
195 46 997  8/1997  Germany .

OTHER PUBLICATIONS

"Neue Werkstoffverbunde durch Ultraschallschweissen" by E. Roeder et al, in "technologie & management", vol. 44 (1995), pp. 31 to 39.

"Ultraschall–Rollnahtschweissen von Glas und Keramik mit Metall" by U. Schlicker et al, in "Schweissen & Schneiden", vol. 49, (1997), pp. 564 to 565.

*Primary Examiner*—Georgia Epps
*Assistant Examiner*—Ricky Mack
*Attorney, Agent, or Firm*—Walter Ottesen

[57] ABSTRACT

The invention is directed to a method for welding a large optical component to a metal fixture. The transparent optical component is held in a vibration damping manner at its edge generally at opposite locations and next to an attachment location. The attachment is placed on the attachment location and the metal attachment is placed on the attachment location at the edge of the expanded optical component and the sonotrode is then placed on the attachment while applying only slight bending torques, if at all, and shearing forces. The ultrasonic welding is then carried out. In this way, the ultrasonic welding of optical components to metal attachments is made available even for large highly sensitive optical components. This is so especially when these components can be subjected only to slight loads because of their high sensitivity and/or high optical quality.

29 Claims, 2 Drawing Sheets

METHOD OF WELDING AN OPTICAL COMPONENT TO A METAL ATTACHMENT ELEMENT AND AN OPTICAL ASSEMBLY INCORPORATING THE METAL ATTACHMENT ELEMENT

BACKGROUND OF THE INVENTION

Connecting transparent optical components to metal attachment elements is known per se. Depending upon the application, the connections can be produced by clamping, gluing or in other ways.

Highly sensitive optics are used, for example, in semiconductor manufacture for exposing wafers. To expose photomasks with ultraviolet light, an extremely high precision of attachment is required for highly sensitive optics. A simple clamping of an optical component between metal parts is therefore generally viewed as inadequate. The use of adhesives for attaching the optical component to a metal fixture is often unwanted because adhesives of this kind emit gas and the gas-emitting components are absorbent in the ultraviolet range required for making exposures.

German patent publication 4,216,337 discloses a component for an optic, optoelectronic or electronic apparatus which has parts made of two metals which are to be connected to each other and which exhibit different thermal coefficients of expansion. A connecting part, which is manufactured by roll-bonded cladding, is inserted between the parts made of different metals. The connection of the connecting part to the parts, which are to be connected to each other, is made by welding, soldering or gluing.

European patent publication 0,106,230 discloses a method for mounting and adjusting cavity mirrors of a laser. In this publication, mirror supports are connected by wringing to a base made of the same material.

It is also known to join metals to non-metals by ultrasonic welding. A method of ultrasonic welding for this purpose is disclosed in German Patent 2,312,724. Here, a method and an apparatus are disclosed for welding a metal part to a non-metal part having a precious metal coating such as a piezoceramic platelet but also a quartz or glass disc with the insertion of a further intermediate layer comprising a metal. In the method, an aluminum layer or foil is applied to the mutually adjacent connecting surfaces of the metal part and of the non-metal part, then the non-metal part is fixed and the aluminum coated connecting surfaces are placed one atop the other and preheated to a temperature of at least 250° C. and preferably 350° C. Finally, these preheated parts are connected to each other by ultrasonic welding. It is noted as being especially advantageous to preheat the metal parts in a high frequency electromagnetic field. With this additional external heating (especially of an aluminum layer), it is intended to obtain a homogeneous total surface weld connection and to greatly decrease the sonic energy. This sonic energy is applied to ultrasonically weld the component and often leads to the destruction of the non-metal component.

It is suggested to provide the aluminum intermediate layer by vaporization, sputtering in a plasma light arc or to provide the aluminum intermediate layer in the form of an aluminum foil which is inserted between the components to be connected by welding. It is problematic that the parts have to be preheated to high temperatures and that a total-area connection is intended to be achieved. The total-area connection to the metal carrier hinders the application with transmissive optics.

In German Patent 195 46 997, it is mentioned that, to connect parts of aluminum to parts of ceramic, first the intended connecting region of the ceramic part can be metallized by burning in a metal paste, thermal sputtering or the like so that thereafter, the actual connection can be made by hard soldering. As an alternative, it is suggested in this patent to make the connection by friction welding with a specific form of movement.

A series of scientific papers is directed to the ultrasonic welding of metal and glass. Exemplary here is the article of E. Roeder et al entitled "Neue Werkstoffverbunde durch Ultraschallschweißen" published in "Technologie & Management", volume 44 (1995) starting at page 31. Another article directed to this subject matter is that of U. Schlicker et al entitled "Ultraschall-Rollnahtschweißen von Glas und Keramik mit Metall" published in "Schweißen & Schneiden", volume 49, (1997), starting at page 564.

In the last-mentioned article, the suggestion is made that a sonotrode is pressed via a static welding force to the parts to be joined and rolls onto the joining parts which are moved along synchronously therewith. In this process, the energy needed for joining is applied in the same manner as for the ultrasonic welding of metals in the form of mechanical shearing waves into the joining part facing toward the sonotrode. The coupling takes place because of the higher mechanical load at the sonotrode side and the more favorable coupling of the ultrasonic vibration via the metal workpiece; whereas, the non-metal joining part is placed on a rubber support so as to be fixed against slippage in order to ensure a relative movement to the metal welding partner vibrating transversely to the welding direction. It is suggested to reduce the joining temperature with a coolant and thereby obtain a reduction of the inherent stress in the joint.

SUMMARY OF THE INVENTION

It is an object of the invention to make available the ultrasonic welding of optical components to metal attachment elements even for large optical components. It is especially an object of the invention to make this ultrasonic welding available when these optical components can withstand only the slightest loading because of their high sensitivity and/or high optical quality.

The method of the invention is for ultrasonically welding a large transparent optical component to a metal attachment element, the optical component having an edge and an attachment location whereat the optical component is to be welded to the metal attachment element. The method includes the steps of: holding the optical component at least at the edge generally opposite to and next to the attachment location in a manner to dampen vibrations; placing the metal attachment element on the attachment location on the edge; placing a sonotrode on the metal attachment element while applying low bending torques; and, carrying out an ultrasonic welding operation.

A basic realization for the invention is that a destruction of the very sensitive optical component by the high ultrasonic energy, which is required for ultrasonic welding, can be avoided when the optical component is held at predetermined locations so as to dampen vibrations. These components are of crystalline materials, such as $CaF_2$, which are used in the ultraviolet range. With respect to the above, it is ensured simultaneously with the invention that only slight bending torques, if at all, are applied by the sonotrode to the optical component.

The application of slight bending torques with the simultaneously high application pressure of the sonotrode (that is, a high static welding force) permits the ultrasonic amplitude to be selected to be comparatively low. Accordingly, the ultrasonic energy, which is propagated through the material of the large optical component, is so low that this energy can be absorbed at the one or more vibration damping holders to the extent that a destruction of the optical component can be avoided notwithstanding the correct application of the ultrasonic welding. At the same time, only a minimum of shearing loads occur because of the ultrasonic welding.

It is especially advantageous when the attachment location is provided at a lateral edge of the areally extended optical component and the vibration damping holding takes place on the edge region of the transmission surfaces. This ensures that only the least amount of bending torque is applied. At the same time, a further vibration damping holding device can be provided at an attachment location on a diametrically opposite-lying lateral edge location so that the sonotrode can apply an effective pressure force there. Typical optical components such as quartz glass, calcium fluoride, barium fluoride, magnesium fluoride and even conventional glasses are especially resistant to such pressure forces. The conventional glasses are those used as window panes, on cooking ovens, on automobile headlights and the like. The method of the invention can be used with these elements.

It has been suggested that the optical component is held in a vibration damping manner only at its edge, that is, at a side edge and/or at its transmission surface edge.

When the transparent optical component is held at the edge region of the transmission surface, especially high holding forces are achieved if elastic members are used for holding the component in a vibration damping manner and then a vacuum is generated between the delimited region of the transparent optical component and the elastic elements for fixing the component. The elastic elements surround at least a part of the transmission surface. It can be provided to hold the transparent optical component areally at both sides.

In a preferred embodiment of the method of the invention, the component is first held on one side and a prevacuum is applied and then a prevacuum is applied on the opposite side whereupon a higher vacuum is applied between both holding devices and the component.

The method is especially suitable for very brittle materials especially for crystals such as calcium fluoride, magnesium fluoride or barium fluoride. It can be provided to apply a metal layer to these materials at the attachment locations or to apply a metal layer in a larger region including these attachment locations. Aluminum as a metal is especially suitable and can be applied by sputtering.

The attachment can preferably be of metal and a steel spring, which is coated with a galvanized aluminum layer, can be placed over this aluminum strip for the ultrasonic welding. The thickness of the steel spring can be 0.2 mm.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
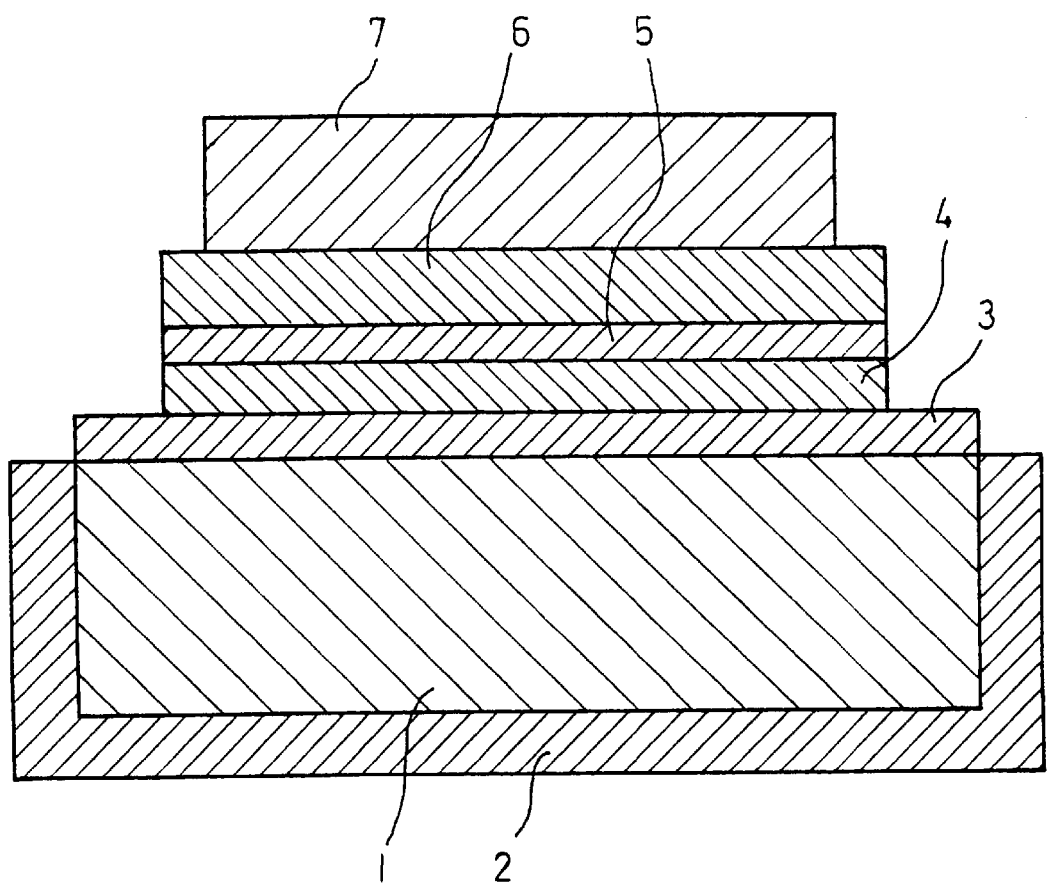
FIG. 1 is an optical component in an elastic holder during ultrasonic welding; and, FIG. 2 is a second embodiment of the invention.

According to FIG. 1, a $CaF_2$-monocrystal is provided as a non-metal material 1, for example, for a large lens of more than 40 mm diameter. The calcium fluoride element 1 is surrounded by a rubber layer 2 having a thickness of, for example, 2 mm and is in the form of an elastic layer, that is, the element 1 is embedded in the elastic layer. The elastic layer effects a dampening of vibration and is provided especially opposite and next to the intended attachment location.

An aluminum layer 3 is applied by sputtering to the calcium fluoride element which is a non-metallic material. The thickness of the sputtered aluminum layer 3 can be 0.05 mm. An aluminum strip 4 having a thickness of, for example, 0.15 mm is applied over the sputtered aluminum layer 3. A steel spring coated with a galvanized or sputtered aluminum layer 5 is placed over the aluminum strip for ultrasonic welding. The thickness of the aluminum coating 5 can likewise be 0.05 mm. The thickness of the steel spring is, for example, 0.2 mm.

An applied force in the form of an areal load is applied to the above-mentioned assembly for ultrasonic welding with a sonotrode 7 via the steel spring 6. The areal load is applied to the components, which are to be joined to each other. The sonotrode 7 executes a deflection of a few $\mu m$.

The higher the amplitude during the welding operation, the more susceptible the calcium fluoride layer 1 is to damage. The rubber layer 2 however, has a significant effect during the welding operation. Likewise, the damping increases and therefore the loadability of the calcium fluoride layer 1 with increasing thickness of the sputtered aluminum layer 3.

Because of the aluminum layer 5 as a coating for the steel spring 6, a damping of the ultrasonic waves during the welding operation is achieved to prevent damage to the calcium fluoride layer.

The ultrasonic welding itself is carried out in a manner known per se.

In the method of the invention, chemical bonds between the blank aluminum surfaces form relatively rapidly during the welding operation and these bonds ensure a correspondingly good connection.

A further preferred variation of the invention will be described with reference to FIG. 2.

Figure 2:
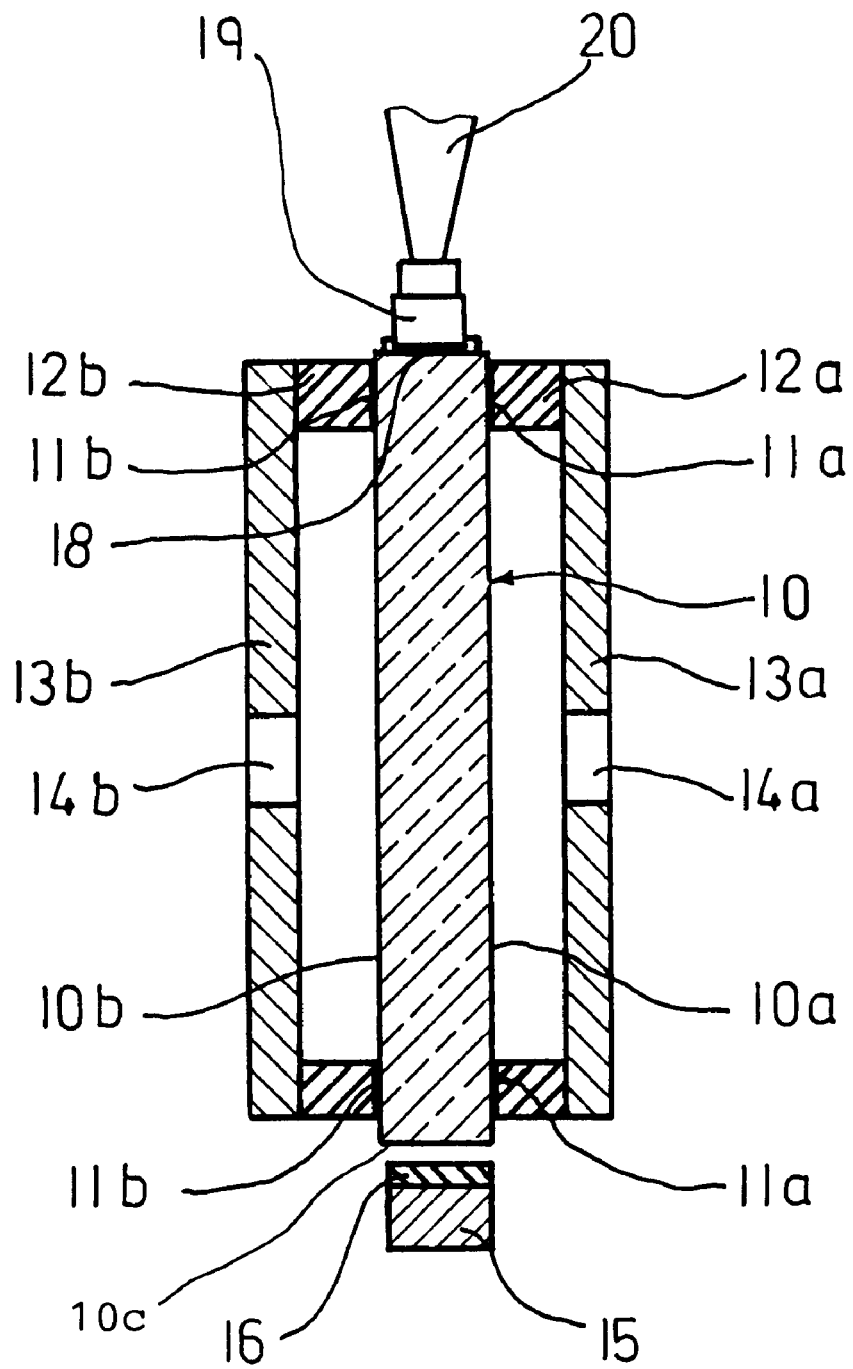

In FIG. 2, reference numeral 10 identifies a round $CaF_2$ disc as a flat transparent optical component. This component defines transmission surfaces (10a, 10b) and at least one end face 10c which defines the cylindrical wall.

A rubber ring (12a, 12b) lies tightly on each of the outer edges (11a, 11b) of the opposite-lying transmission surfaces (10a, 10b). The rubber rings (12a, 12b) extend about the peripheral region as shown. The rubber is elastic and has a high inner damping. For this purpose, the rubber base material can, for example, be provided with additives such as powdered tungsten or the like.

Each rubber ring 12 is on its side, which faces away from the $CaF_2$ disc 10, in pressure-tight contact with a stable metal plate 13. The plate 13 has an evacuation opening 14 at the center thereof to which a pump line (not shown) is connected.

A stable holder 15 is provided on an end of the peripheral surface 10c. The holder 15 carries a rubber protector 16 at its side facing toward the $CaF_2$ disc 10 on which the $CaF_2$ disc 10 lies. The attachment location is provided on the diametrically opposite-lying end and a layer 18 of aluminum is sputtered onto the $CaF_2$ disc at this attachment location. A metallic attachment element 19 is placed over the layer 18 and a sonotrode 20 is pressed onto the attachment element.

With an arrangement of this kind, a connection between the metallic attachment element 19 and the $CaF_2$ disc 10 is produced as explained below.

First, the CaF$_2$ disc 10 is provided with a metal layer 18 on its periphery 10c.

The stable metal plate 13b is horizontally arranged and the CaF$_2$ disc 10 is placed with its transmission surface 10b onto the rubber ring 12b corresponding thereto. The air between the plate 13b and the disc 10 is removed to a prevacuum of, for example, $10^{-4}$ mbar via the evacuation opening 14. The CaF$_2$ disc 10 then adheres so strongly to the stable metal plate 13b that the latter can be moved in the vertical direction without the CaF$_2$ disc slipping off. The intense adherence is brought about by the large diameter of the disc 10 of, for example, over 40 mm. On the opposite side, the second metal plate 13a is placed with the rubber ring 12a against the second transmission surface 10a.

The hollow spaces between the two plates (13a, 13b) and the disc are evacuated to a pressure which lies below the prevacuum. The evacuation pressure is so selected that the disc even without holding device 15 is not moved under the applied pressure of the sonotrode. This ensures that the disc, if necessary, can be moved insignificantly even when the welding locations and the holding devices do not lie exactly diametrically opposite each other. This permits one to work with a force control in the subsequent ultrasonic welding which is preferred for obtaining uniform results. Then, the disc, which is held in this manner, is placed in the lower region of the periphery 10c of the CaF$_2$ disc 10 onto the rubber protection 16 of the stable holder 15. The metallic attachment element 19 is arranged on the aluminum sputter layer 18 on the diametrically opposite end and the sonotrode 20 is tightly pressed onto the attachment element 19.

The pressure is substantially taken up by the holder 15 without the shearing forces acting on the optic. The brittle material resists this load especially well. This material is easily breakable when bending torques or shearing forces are applied. Thereafter, the sonotrode is excited and the ultrasonic welding connection is produced. Because the vibrations caused by the ultrasonic energy (penetrating the CaF$_2$ disc) are attenuated at the rubber rings 12 (especially next to the welding location) and at the holder 15 (generally lying diametrically opposite), there is no danger of a breakage of material.

The method is applicable especially for producing large ultraviolet optics having a diameter of at least 40 mm and for wavelengths shorter than 365 nm as they are used in the exposure of semiconductor masks. Other applications include the connection of automobile headlight glass to reflectors, cooking oven doors to viewing windows and glass components when building facades, et cetera. In these connections, a desired resistance to heat is wanted.

It is understood that the foregoing description is that of the preferred embodiments of the invention and that various changes and modifications may be made thereto without departing from the spirit and scope of the invention as defined in the appended claims.

What is claimed is:

1. A method for ultrasonically welding a large transparent optical component to a metal attachment element, the optical component having an edge and an attachment location whereat said optical component is to be welded to said metal attachment element, the method comprising the steps of:

applying a holding device incorporating an elastic member to said optical component so as to hold said optical component with said elastic member substantially opposite to and next to said attachment location in a manner to dampen vibrations;

placing said metal attachment element on said attachment location on said edge;

placing a sonotrode on said metal attachment element while applying low bending torques; and, carrying out an ultrasonic welding operation.

2. The method of claim 1, wherein said optical component is held exclusively at or near said edge so as to dampen vibrations.

3. The method of claim 1, comprising the further steps of:

bringing said optical component into contact with said elastic member for holding said optical component so as to dampen vibrations with said elastic member enclosing at least a part of the surface of said optical component; and, generating a vacuum between said elastic member and said optical component for fixing said optical component.

4. The method of claim 3, wherein said optical component is an extended lens having first and second transmission surfaces; and, said extended lens is held at least on both of said transmission surfaces.

5. The method of claim 4, wherein said optical component is held by a vacuum at both of said transmission surfaces during said ultrasonic welding operation.

6. The method of claim 1, wherein said holding device includes two elastic members and wherein the method comprises the further steps of:

first bringing said optical component into contact with a first one of said elastic members;

applying a prevacuum between said first elastic member and said optical component;

establishing contact between said optical component and the second one of said elastic members; and, applying a primary vacuum between said first and second elastic members and said optical component with said primary vacuum having a lower pressure than the pressure of said prevacuum.

7. The method of claim 6, wherein said prevacuum is in the order of magnitude of $10^{-4}$ mbar and said primary vacuum is in the order of magnitude of $10^{-6}$ mbar.

8. The method of claim 1, wherein said optical component has a diameter $\geq 40$ mm.

9. The method of claim 1, wherein said optical component has a high transmission and imaging quality for wavelengths of $\leq 365$ nm.

10. The method of claim 1, wherein said optical component is made of one of the following: calcium fluoride, barium fluoride or quartz glass.

11. The method of claim 10, comprising the further step of: applying a layer of metal to said optical component at said attachment location preparatory to placing said metal attachment element.

12. The method of claim 11, wherein said layer of metal is applied by sputtering.

13. The method of claim 10, comprising the further step of applying a layer of aluminum to said optical component at said attachment location preparatory to placing said metal attachment element.

14. The method of claim 13, wherein said layer of aluminum is applied by sputtering.

15. The method of claim 1, comprising the further step of applying a layer of metal to said optical component at said attachment location before placing said metal attachment element.

16. The method of claim 15, wherein said layer of metal is applied by sputtering.

17. The method of claim 1, comprising the further step of applying a layer of aluminum to said optical component at said attachment location preparatory to placing said metal attachment element.

18. The method of claim 17, wherein said layer of aluminum is applied by sputtering.

19. The method of claim 1, comprising the further step of placing a metal spring between said sonotrode and said metal attachment element.

20. The method of claim 19, comprising the further step of applying a coating to said metal spring before said metal spring is placed between said sonotrode and said metal attachment element.

21. The method of claim 20, wherein said coating is aluminum applied by sputtering or applied galvanically.

22. The method of claim 1, wherein said metal attachment element is an aluminum strip.

23. The method of claim 19, wherein said optical component has a diameter of at least 40 mm or a linear dimension of at least 40 mm and is configured for imaging ultraviolet light having a wavelength of $\leq 365$ nm.

24. A component assembly comprising:

a large optical component;

a metal attachment element for holding said large optical component;

said optical component having a lateral surface and carrying a metal layer on said lateral surface;

said optical component and said metal attachment element conjointly defining at least one connecting location whereat said optical component and said metal attachment element are joined to each other; and, an ultrasonic weld is provided at said connecting location between said metal attachment element and said metal layer.

25. The component assembly of claim 24, wherein said ultrasonic weld is an ultrasonic weld seam.

26. The component assembly of claim 24, wherein said optical component is made of one of the following: calcium fluoride, barium fluoride or quartz glass.

27. The component assembly of claim 24, wherein said metal attachment element is a metal strip and/or wherein said metal layer is aluminum.

28. A component assembly comprising:

a large optical component;

a metal attachment element for holding said large optical component;

said optical component and said metal attachment element conjointly defining at least one connecting location whereat said optical component and said metal attachment element are joined to each other; and, an ultrasonic weld is provided at said connecting location between said metal attachment element and said optical component.

29. A method for ultrasonically welding a large transparent optical component to a metal attachment element, the optical component having an edge and an attachment location on said edge whereat said optical component is to be welded to said metal attachment element with said optical component being subjected to vibrations during welding, the method comprising the steps of:

applying a holding device incorporating an elastic member to said optical component so as to hold said optical component with said elastic member along said edge and next to said attachment location in a manner to dampen said vibrations;

placing said metal attachment element on said attachment location on said edge;

placing a sonotrode on said metal attachment element while applying low bending torques; and, carrying out an ultrasonic welding operation to weld said metal attachment to said edge at said location.

* * * * *